United States Patent
Chen et al.

(10) Patent No.: US 11,829,878 B2
(45) Date of Patent: *Nov. 28, 2023

(54) DEEP REINFORCEMENT LEARNING FRAMEWORK FOR SEQUENCE LEVEL PREDICTION OF HIGH DIMENSIONAL DATA

(71) Applicant: Sony Interactive Entertainment Inc., Tokyo (JP)

(72) Inventors: Ruxin Chen, Redwood City, CA (US); Naveen Kumar, San Mateo, CA (US); Haoqi Li, Los Angeles, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,602

(22) Filed: Jun. 29, 2022

(65) Prior Publication Data

US 2022/0327828 A1 Oct. 13, 2022

Related U.S. Application Data

(63) Continuation of application No. 17/141,028, filed on Jan. 4, 2021, now Pat. No. 11,386,657, which is a
(Continued)

(51) Int. Cl.
*G06N 3/08* (2023.01)
*G06N 20/00* (2019.01)
(Continued)

(52) U.S. Cl.
CPC ............. *G06N 3/08* (2013.01); *G06F 18/217* (2023.01); *G06N 3/006* (2013.01); *G06N 20/00* (2019.01);
(Continued)

(58) Field of Classification Search
CPC ............................ G06V 40/174; G06V 10/82
(Continued)

(56) References Cited

U.S. PATENT DOCUMENTS

| | | |
|---|---|---|
| 10,885,341 B2 | 1/2021 | Chen et al. |
| 2014/0108309 A1 | 4/2014 | Frank et al. |

(Continued)

OTHER PUBLICATIONS

Extended European Search Report dated Nov. 16, 2020 for Application No. EP18871311.9.
(Continued)

*Primary Examiner* — Kiet M Doan
(74) *Attorney, Agent, or Firm* — JDI PATENT; Joshua D. Isenberg; Robert Pullman

(57) ABSTRACT

In sequence level prediction of a sequence of frames of high dimensional data one or more affective labels are provided at the end of the sequence. Each label pertains to the entire sequence of frames. An action is taken with an agent controlled by a machine learning algorithm for a current frame of the sequence at a current time step. An output of the action represents affective label prediction for the frame at the current time step. A pool of actions taken up until the current time step including the action taken with the agent is transformed into a predicted affective history for a subsequent time step. A reward is generated on predicted actions up to the current time step by comparing the predicted actions against corresponding annotated affective labels.

30 Claims, 4 Drawing Sheets

Related U.S. Application Data continuation of application No. 16/171,018, filed on Oct. 25, 2018, now Pat. No. 10,885,341.

(60) Provisional application No. 62/577,970, filed on Oct. 27, 2017.

(51) Int. Cl.
  *G06N 3/006* (2023.01)
  *G06V 20/40* (2022.01)
  *G06V 40/16* (2022.01)
  *G06F 18/21* (2023.01)

(52) U.S. Cl.
  CPC ............ *G06V 20/41* (2022.01); *G06V 40/161* (2022.01); *G06V 40/174* (2022.01)

(58) Field of Classification Search
  USPC .................................................. 382/181, 118
  See application file for complete search history.

(56) References Cited

U.S. PATENT DOCUMENTS

| | | | |
|---|---|---|---|
| 2014/0201126 A1* | 7/2014 | Zadeh | A61B 5/165 706/52 |
| 2015/0193688 A1 | 7/2015 | Thieberger et al. | |
| 2017/0178346 A1 | 6/2017 | Ferro et al. | |
| 2017/0262705 A1 | 9/2017 | Li et al. | |
| 2017/0262996 A1 | 9/2017 | Jain et al. | |
| 2018/0121733 A1 | 5/2018 | Joshi et al. | |
| 2019/0163977 A1 | 5/2019 | Chen et al. | |
| 2021/0124930 A1 | 4/2021 | Chen et al. | |

OTHER PUBLICATIONS

Goren Gordon et al: "Affective Personalization of a Social Robot Tutor or Children's Second Language skills", AAAI 16: Proccedings of the Thirtieth AAAI Conference on Artificial Intelligence, Feb. 12, 2016 (Feb. 12, 2016), XP055747275, Retrieved from the Internet:URL: https://jakory.com/static/papers/Gordon_AAAI2016_SAR.pdf [retrieved on Nov. 5, 2020].

Haoqi Li, Naveen Kumar, Ruxin Chen, "A Deep Reinforcement Learning Framework for Identifying Funny Scenes in Movies" by 2018 IEEE International Conference on Acoustics, Speech and Signal Processing (ICASSP), pp. 3116-3120.

Haoqi Li, Naveen Kumar, Ruxin Chen, "A Deep Reinforcement Learning Framework for Identifying Funny Scenes in Movies" by 2018 IEEE International Conference on Acoustics, Speech and Signal Processing (ICASSP), Short version.

International Search Report & Written Opinion dated Jan. 16, 2019 for International Patent Application No. PCT/US2018/057573.

Non-Final Office Action for U.S. Appl. No. 16/171,018, dated Apr. 20, 2020.

Notice of Allowance for U.S. Appl. No. 17/141,028, dated Mar. 15, 2022.

Pooya Rezvani Khorrami: "How Deep Learning Can Help Emotion Recognition", Ph.D. Dissertation, Mar. 29, 2017 (Mar. 29, 2017), XP055747261, Urbana, Illinois; Retrieved from the Internet:URL:https://www.ideals.illinois.edu/bitstream/handle/2142/97284/KRORRAMI-DISSERTATION-2017.pdf?sequence=1&isAllowed=y[retrieved on Nov. 5, 2020].

Rao Yongming et al: "Attention-Aware Deep Reinforcement Learning for Video Face Recognition", 2017 IEEE International Conference on Computer Vision (ICCV), IEEE, Oct. 22, 2017 (Oct. 22, 2017), pp. 3951-3960, XP033283267, DOI: 10.1109/ICCV.2017.424 [retrieved on Dec. 22, 2017].

U.S. Appl. No. 62/577,970, filed Oct. 27, 2017 to Ruxin Chen, Naveen Kumar and Haoqi Li.

\* cited by examiner

DEEP REINFORCEMENT LEARNING FRAMEWORK FOR SEQUENCE LEVEL PREDICTION OF HIGH DIMENSIONAL DATA

CLAIM OF PRIORITY

This application is a continuation of U.S. patent application Ser. No. 17/141,028 filed Jan. 4, 2021, the entire contents of which are incorporated herein by reference. U.S. patent application Ser. No. 17/141,028 is a continuation of U.S. patent application Ser. No. 16/171,018 filed Oct. 25, 2018, the entire contents of which are incorporated herein by reference. U.S. patent application Ser. No. 16/171,018 claims the priority benefit of U.S. Provisional Patent Application No. 62/577,970 filed Oct. 27, 2017, the entire contents of which are incorporated herein by reference.

BACKGROUND

With widespread video-on-demand mobile phone applications and websites (e.g. youtube.com) people can access an unprecedented amount of video from diverse online sources. Because of this, extracting video metadata (e.g., movie scene annotations) plays an important role in facilitating efficient search and recommendation. For example, a movie recommendation system needs to identify movie clip scene affective information and refer it to corresponding users based on their requests or interests.

However, most reliable movie annotations are still manually generated since movie scene affective labels, such as whether a scene is funny or not, are often manifested over longer timescales. When human annotators try to identity the affective label of a movie scene, they need to take a longer context into consideration. It is not an easy job to simulate this complex non-linear nature of human annotation process using one specific algorithm. In addition, movie affective label prediction is a much more challenging and complex task than emotion prediction based using a well-prepared standard emotion database. Moreover, scene level affective labels often result from multiple modalities. For example, movies contain information from visual, acoustic and lexical channels. When annotators label a movie scene as funny, the assessment might be because of the actor or actress's facial expressions, the transcript they used, or just the background music. More generally, annotators typically assemble all this information together to evaluate a scene as funny or not. Although there are massive movie audio resources available, those with accurate scene level annotation are often severely limited in quantity due to copyright and cost of annotation. Thus, affective classification on the movie scene is still a complicated and challenging task in terms of on both technical algorithm as well as data collection.

A lot of related research work focuses on movie affective content analysis. Recently, deep learning methods, such as convolutional neural networks (CNNs) have been used to extract a mid-level representation and apply it to the understanding of affective video. Most of the related research work in this field has used supervised machine learning approaches.

It is within this context that aspects of the present disclosure arise.

DETAILED DESCRIPTION

Introduction

Figure 1:
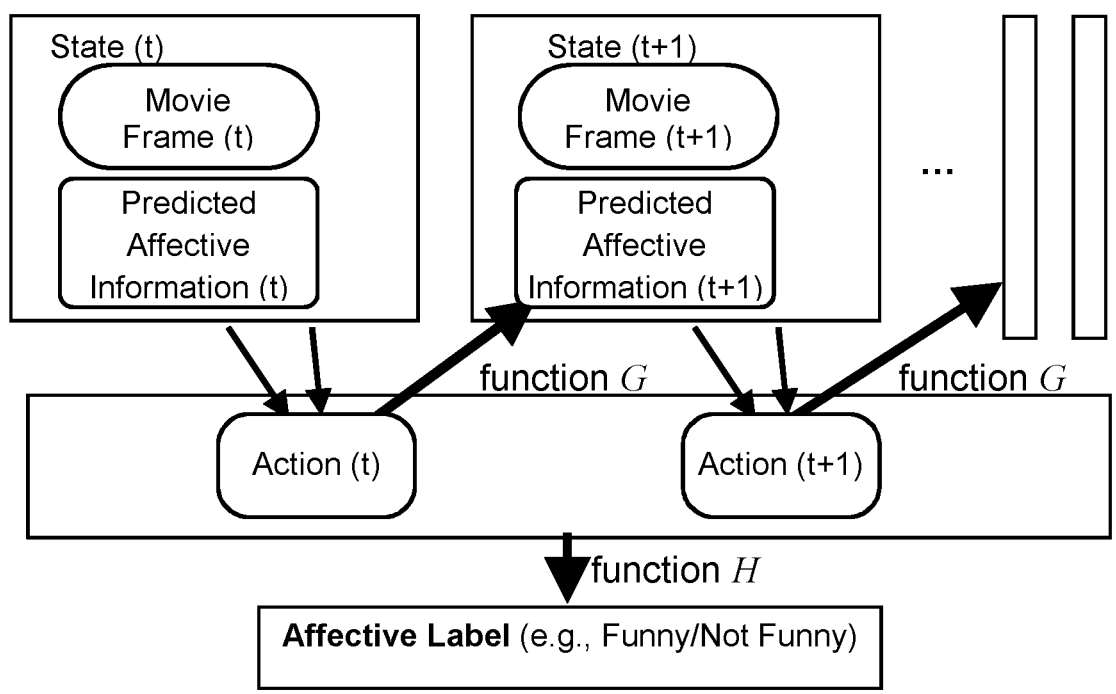
FIG. 1 is a schematic diagram illustrating a proposed RL framework on movie affective label prediction in accordance with aspects of the present disclosure.

At a high level, the concept behind the present disclosure is to use an artificial Intelligence (AI) approach to improve systems for annotating video content with affective labels through a trial and error mechanism. Reinforcement learning (RL) is a framework for experience driven autonomous learning method. With the use of deep learning within RL, a defined field, "deep reinforcement learning" (DRL) is playing a revolutionary role in the field of machine learning. The rise of DRL mainly comes from two aspects. The first aspect is the powerful function approximation and representation learning properties of deep neural networks (DNNs). With DNNs, the low-dimensional feature representations can be obtained from high dimensional data (e.g., images, audio, and text), which allows DRL to solve decision-making problems with a high-dimensional state and action space. The second aspect is RL's "exploration and exploitation" property. Exploration is related to gathering more information, which means that the system will explore different possible trials to see if they are better than what has been tried before. Exploitation ensures that the system makes the best decision given current information, which means the system memorizes strategies that have worked best in the past. These two advantages are a significant advance over many other traditional supervised learning methods.

Aspects of the present disclosure are directed to a novel approach using deep reinforcement learning (DRL) to perform sequence level prediction, e.g., in video content, e.g., movies, television programs, and the like. Supervision in the form of ground truth labels is only provided at the end of a sequence and the label itself pertains to the entire sequence. This problem may be formulated as a game where a DRL agent tries to "guess" the global label given only data up to the current time step. This "guess" represents the agent's internal belief about the label and influences any further decisions the agent makes. This belief is additionally also used to compute a reward function which helps in training the DRL algorithm. Different strategies for computing reward functions have been explored and show that a weakly-supervised approach such as DRL can be useful in tasks such as emotion prediction where it might be easier to annotate at a global level. One implementation according to an aspect of the present disclosure includes an algorithm for implementing movie scene affective label prediction. In this example, the algorithm employs a pre-trained convolutional network to capture complex human affective information from actor's faces in a scene to understand if a particular movie scene is funny or not. A traditional DRL framework cannot be applied to this task directly. In traditional DRL the decision generated at each frame must interact with the environment altering its state, e.g., in a Ping-Pong game or AlphaGO. Since a movie scene data sequence is determined already, each frame's predicted affective label decision cannot interact with the environment. A slightly modified DRL framework implemented by the algorithm makes it possible for the DRL agent to interact with environment state. This is described in detail below.

Methodology

The movie scene clip can be regarded as the sequence of data samples along different modalities. For example, from the speech modality the clip may contain audio signals, from the visual modality there may be a sequence of image frames within each movie scene clip. For the affective label prediction task, human annotators need to process dynamic temporal affective information to obtain the correct label. For RL application, the agent's action decision also contains strong temporal correlations, and current action decision plus the rewards also depends on previous steps. Thus, we try to use RL to predict the affective label for movie clips.

By way of example, and not by way of limitation, focus may be restricted to video data using an image sequence from a set of video frames as input. The modified DRL algorithm tries to predict affective scene labels based on analysis of one or more actors faces at each movie frame.

Framework for Proposed Method

According to aspects of the present disclosure a new DRL framework includes interaction between an environment state and agent action. The proposed RL framework is illustrated schematically in FIG. 1.

The video information in a movie scene may be represented as a sequence of faces depicted each frame. At each time step t, the environment state has two components, the video frame at time step t and the predicted affective information from the previous time step t−1. By considering this information jointly, the agent, controlled by a machine learning algorithm, takes an action A(t). The output of the action represents affective label prediction at the time step t, e.g. funny or not funny. The function G is then used to transform the pool of predicted actions so far {A(i): i≤t} to a predicted affective history at the next time step t+1. This information is included as part of the environment state for the next time step and similarly used by the agent to generate the next action at time t+1. At each step, the reward is generated by a function H based on predicted actions up to the current time step t, by comparing them against the corresponding human annotated movie scene affective label.

In this proposed RL structure, we use the function G, to add predictions from previous time steps, from the agent's action, into the current environment state, thereby establishing a connection between the agent's action and the environment state. With the proposed RL structure, different functions G and H can be designed for different applications.

Video Data Processing

An affective label classification dataset may be created from original video data, e.g., original movies, and corresponding annotation files. By way of example, the labeling of scenes in a movie as either funny or may focus on particular features depicted in the video channel of the movie, specifically the characters' faces. A sequence of these face image is pre-extracted from the video and utilized as an input to our system. To detect the faces at each frame, standard face detection libraries such as dlib and openCV may be used to extract face images from original video at each consecutive frame. If a frame contains multiple faces, the one closest to the center of the frame may be selected. The intuition behind this selection is that when multiple faces are shown on screen it is quite likely that the main character's face is located in the center of the screen to dominate the scene's affective information. In addition, the face selected by this criterion also often turns out to be the largest in area compared to other detected faces.

If there are multiple faces in a frame, the face in the most central position may be selected, since there is a high probability that the main character is located at the center of the screen to dominate the scene's affective information, and often this selected face is the largest one among all other detected faces.

Figure 2:
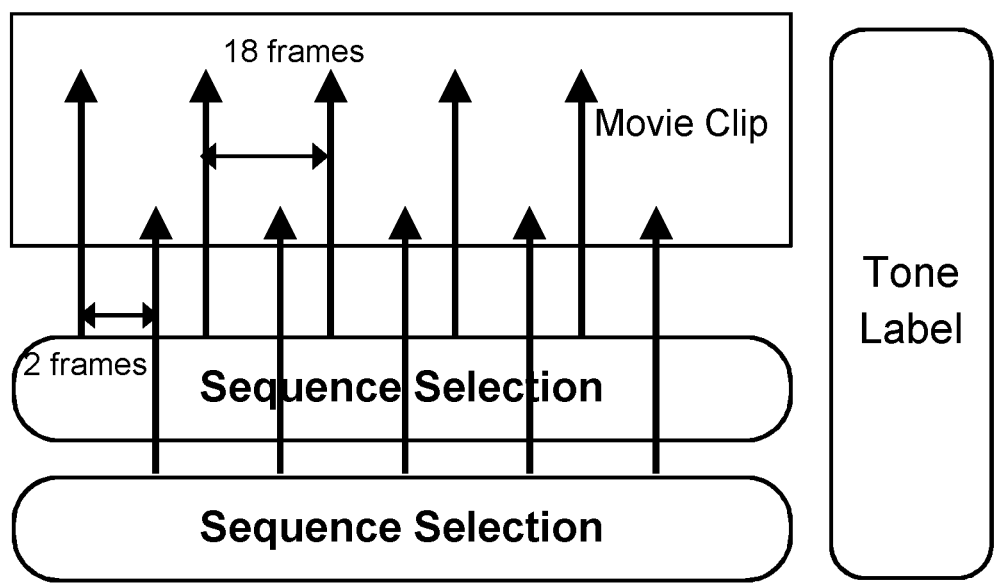
FIG. 2 is a schematic diagram illustrating a proposed movie sequence generation method in accordance with aspects of the present disclosure.

Another processing task is to generate training sequences. The amount of the annotated movie data is quite small due to the limited number of available movies and expensive human annotation process. Because of the little time gap between frames, the difference in faces from one frame to the next is quite small. To obtain more sequences used in learning, a face sequence of each movie scene may be generated in the following manner. For each scene, the frame sequence may be down sampled, e.g., at an interval of 18 frames to get one sequence of frames. Also, to obtain more training data via one scene, all previous sampling indices may be shifted every two frames, and all generated samples from same video scene share the same affective label. By doing this, the dynamic change of faces within every sequence is considered and at the same time, more training samples are obtained based on limited video data. This process is shown in FIG. 2.

Facial Expression Embedding

Instead of training from cropped face images from movie directly, an additional facial expression dataset may be used to generate face expression embedding. By way of example, and not by way of limitation a neural network trained with Convolutional Neural Networks (CNNs) may be used to classify different facial expression labels.

RL of Affective Label Prediction

In one implementation, a deep Q-network (DQN) may be used with an RL framework according to aspects of the present disclosure. The input of DQN may include two parts: a) facial expression embedding, which may be the output of the second to last layer of the pre-trained CNNs of facial embedding model discussed above; and 2) the predicted affective information input vector, which includes the video frame data at time step t and the predicted affective information from the previous time step t−1, as discussed above. Two fully connected layers of affective information input are added and concatenated with the facial expression embedding to further be connected with three additional dense layers. At the final layer of DQN, the network may output a discrete two-dimensional action. In such implementations affective label prediction works as a binary classification decision for the affective label, e.g., a one-hot two dimension vector of being funny or not funny.

A number of different types of function G may be used to represent affective information. For example, the action embedding output, which is the output of the second last layer of the DQN may be regarded as one high dimension feature representation vector with all previous state memory. Alternatively one may directly use the one-hot classification label identified by the DQN output showing the previous time step's action decision label, e.g., funny or not funny.

In RL, the setting of the reward function is important, since the reward value is used to update the Q value, and the DQN uses the reward, which is the difference between the score for the current frame t and the score for the previous frame t−1, to learn the action decision. Some implementations annotated labels might not be available for each frame of a video scene. Instead, for each training sequence sample, only the human annotated label for a whole training sequence might be available. Within each face sequence, the frame level affective label is not available. In such implementations, the reward-generating function H may be designed such that within each frame sequence training sample, the reward value is based on a majority vote of frame-level results from the last human annotated frame up to the current frame t. The reward value can also be based on the minimum percentage vote of the frame-level results. For example, if 20% or more of frame-level results are "funny" and the final human label is "funny" the reward may be +1. Based on this design, a reward may be assigned at each frame step, not just at the end of a whole sequence. In alternative implementations, there may not be any reward until the moment when the human annotation is available.

The reward value can be critical to the effectiveness of sequence level prediction using RL according to aspects of the present disclosure. If the reward value is too large or too small, the RL system doesn't converge and fails to learn affective information. It is also important to consider the weighting factor for intermediate step and last step rewards.

For one training sequence, the last action generated by the agent takes all images into consideration. What's more, the ground truth label is available. Thus, a large value for reward $R_{end}$ should be assigned. However, at intermediate time steps, it is not guaranteed that each frame's tone label should be identical to the sequence label.

This assumption is consistent with common understanding. For example, when one thinks a movie scene is funny, it is not guaranteed that every frame of the scene contains funny information. Since the affective label is accumulated through a whole frame sequence, the reward at an intermediate time step, represented as $R_{inter}$, should be assigned a smaller value to show uncertainty and lower priority.

More details of the configuration of possible experiments and designs of these functions can be found in "A DEEP REINFORCEMENT LEARNING FRAMEWORK FOR IDENTIFYING FUNNY SCENES IN MOVIES" by Haoqi Li, Naveen Kumar, Ruxin Chen, 2018 IEEE International Conference on Acoustics, Speech and Signal Processing (ICASSP), pages 3116-3120, which is incorporated herein by reference and included as part of this disclosure as an APPENDIX.

Method

Figure 3:
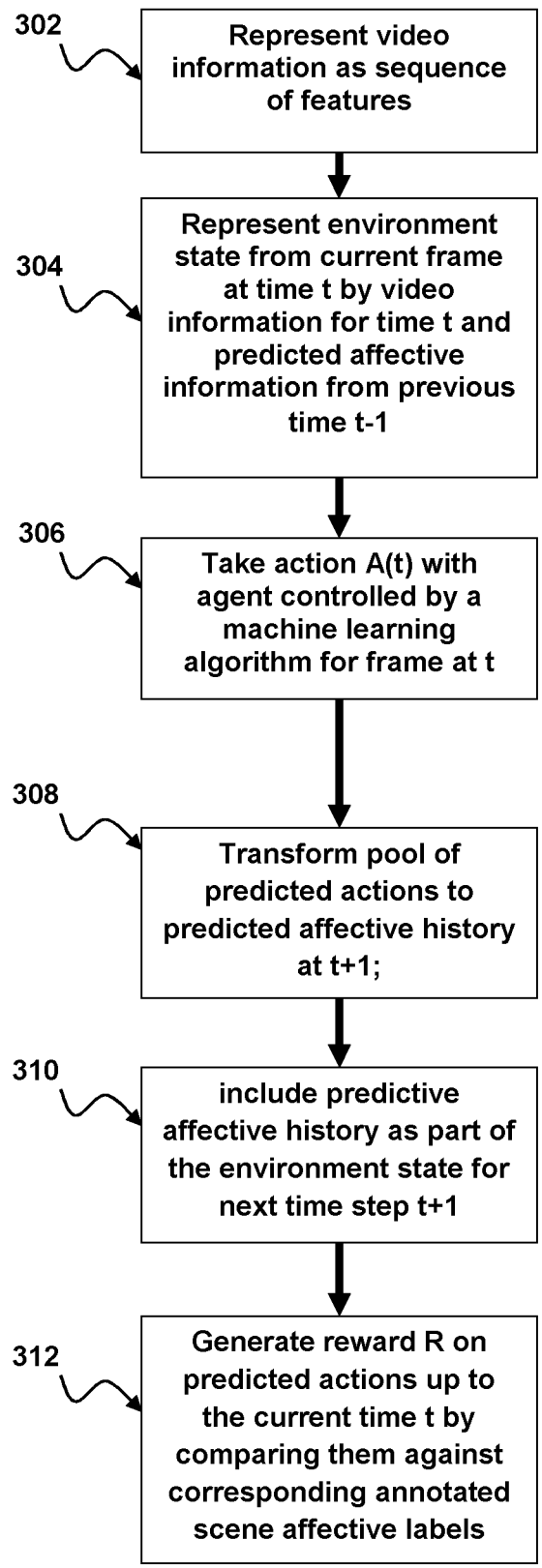
FIG. 3 is a flow diagram illustrating a method for performing sequence level prediction of a video scene, comprising in accordance with aspects of the present disclosure.

The flow diagram shown in FIG. 3 depicts an example of a method for performing sequence level prediction of a video scene in accordance with aspects of the present disclosure. The method begins at 302 by representing video information in the video scene as a sequence of features depicted each frame. By way of example, and not by way of limitation, the sequence of features may be a sequence of faces appearing in the video scene. The sequence of faces may be a sequence of faces of an individual character in the video scene. When multiple faces are shown in the video scene the sequence of faces may be a sequence of faces of located in the center of the scene. Next, as indicated at 304, an environment state for each time step t corresponding to each frame is represented by the video information for time step t and predicted affective information from a previous time step t−1. An action A(t) is then taken with an agent controlled by a machine learning algorithm for the frame at step t, as indicated at 306. An output of the action A(t) represents affective label prediction for the frame at the time step t. By way of example, and not by way of limitation, the affective label prediction at the time step t may represent whether the video scene is funny or not funny. However, in alternative implementations, the affective label prediction may represent whether the video scene is sad or not sad.

As indicated at 308, a pool of predicted actions is then transformed, e.g., from an initial frame of the scene up to the current frame at time step t, to a predicted affective history at a next time step t+1. The predictive affective history is included as part of the environment state for the next time step t+1, as indicated at 310. A reward R is generated on predicted actions up to the current time step t by comparing them against corresponding annotated movie scene affective labels, as indicated at 312. In some implementations, the value of the reward R may be based on a majority vote of frame-level affective label prediction results up to the current frame at the time step t.

System

Figure 4:
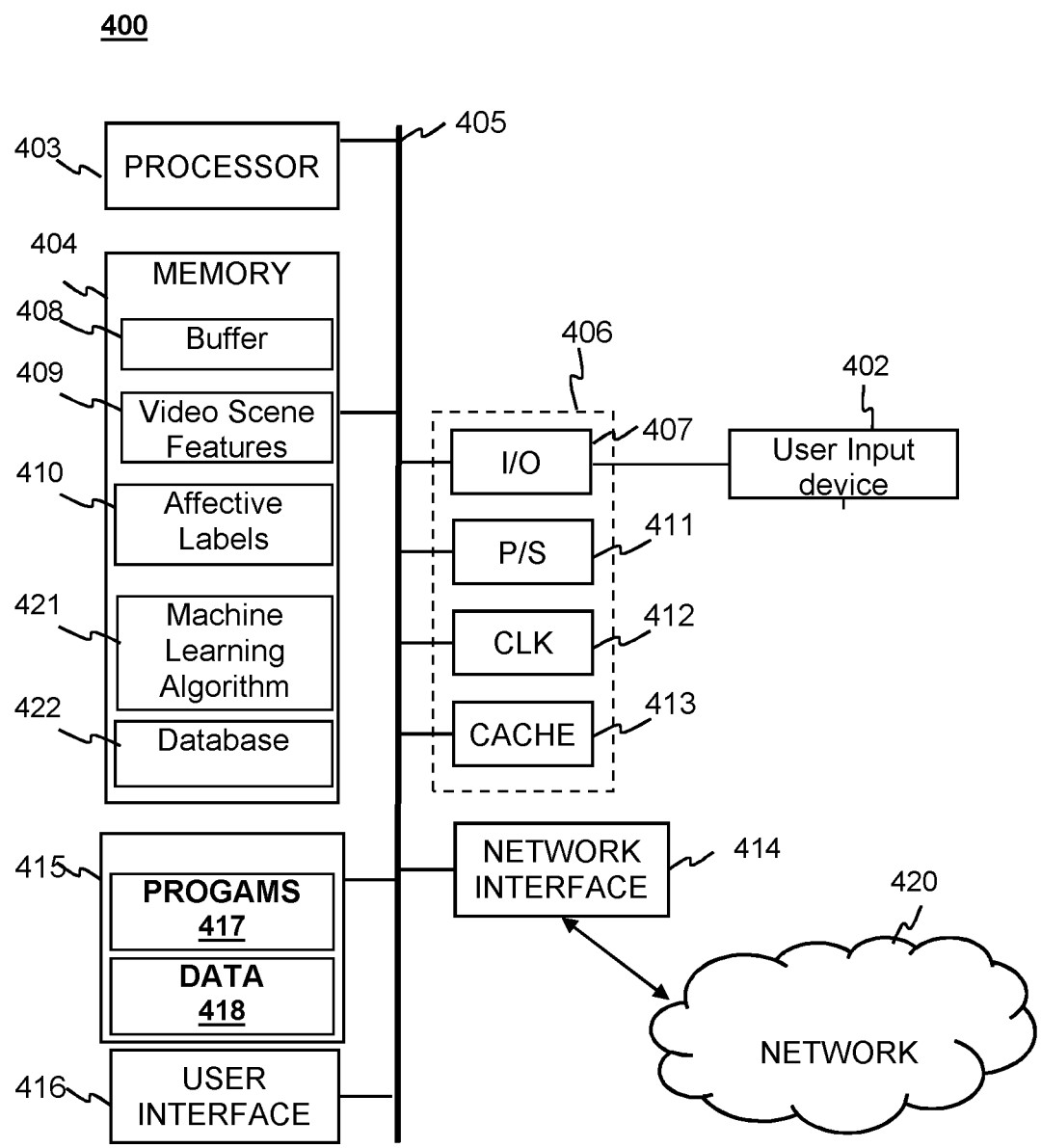
FIG. 4 is a block diagram illustrating a system for performing sequence level prediction of a video scene, comprising in accordance with aspects of the present disclosure.

FIG. 4 depicts a system for implementing a method like that shown in FIG. 3. The system may include a computing device 400 coupled to a user input device 402. The user input device 402 may be a controller, touch screen, microphone, keyboard, mouse, joystick or other device that allows the user to input information including sound data in to the system. The user input device may be coupled to a haptic feedback device. The haptic feedback device may be for example a vibration motor, force feedback system, ultrasonic feedback system, or air pressure feedback system.

The computing device 400 may include one or more processor units 403, which may be configured according to well-known architectures, such as, e.g., single-core, dual-core, quad-core, multi-core, processor-coprocessor, cell processor, and the like. The computing device may also include one or more memory units 404 (e.g., random access memory (RAM), dynamic random access memory (DRAM), read-only memory (ROM), and the like).

The processor unit 403 may execute one or more programs, portions of which may be stored in the memory 404 and the processor 403 may be operatively coupled to the memory, e.g., by accessing the memory via a data bus 405. The memory may include a buffer 408 that stores video frames for a video scene. The programs may include machine learning algorithms 421 configured to extract features 409 from the video frames and to ascribe label predictions 410, as discussed above. Additionally the Memory 404 may contain programs that implement training of a. The Memory 404 may also contain a database 422 with trained data, e.g., video scenes having known labels. The database 422 may be stored as data 418 in the Mass Store 415 or at a server coupled to the Network 420 accessed through the network interface 414.

The input video may also be stored as data 418 in the Mass Store 415. The processor unit 403 is further configured to execute one or more programs 417 stored in the mass store 415 or in memory 404 which cause processor to carry out the method 300, described above.

The computing device 400 may also include well-known support circuits, such as input/output (I/O) 407, circuits, power supplies (P/S) 411, a clock (CLK) 412, and cache 413, which may communicate with other components of the system, e.g., via the bus 405. The computing device may include a network interface 414. The processor unit 403 and network interface 414 may be configured to implement a local area network (LAN) or personal area network (PAN), via a suitable network protocol, e.g., Bluetooth, for a PAN. The computing device may optionally include a mass storage device 415 such as a disk drive, CD-ROM drive, tape drive, flash memory, or the like, and the mass storage device may store programs and/or data. The computing device may also include a user interface 416 to facilitate interaction between the system and a user. The user interface may include a monitor, Television screen, speakers, headphones or other devices that communicate information to the user.

The computing device 400 may include a network interface 414 to facilitate communication via an electronic communications network 420. The network interface 414 may be configured to implement wired or wireless communication over local area networks and wide area networks such as the Internet. The device 400 may send and receive data and/or requests for files via one or more message packets over the network 420. Message packets sent over the network 420 may temporarily be stored in a buffer in memory 404. The categorized sound database may be available through the network 420 and stored partially in memory 404 for use.

Aspects of the present disclosure address problem of using RL methods to label scenes in video using face images by modifying a traditional RL structure to achieve desired interaction between label prediction agent and environment state. Using sequence level prediction of a video scene as discussed herein can generate output affective labels in real time. The described sequence level prediction tries to learn the policy through exploration and exploitation by trying different strategies to see if they are better than what was tried before. The described sequence level prediction also has a memory mechanism that allows it to try things that have worked best in the past. These properties usually cannot be achieved by the regular supervised learning methods, which are usually purely exploitative.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for performing sequence level prediction of a sequence of frames of high dimensional data, comprising:
   a) providing one or more affective labels at the end of the sequence and a facial expression embedding from a trained convolutional neural network, wherein each label of the one or more affective labels pertains to the entire sequence of frames of high dimensional data;
   b) taking an action with an agent controlled by a machine learning algorithm for a current frame of the sequence at a current time step, wherein an output of the action represents affective label prediction for the frame at the current time step; and
   c) transforming a pool of actions taken up until the current time step including the action taken with the agent into a predicted affective history for a subsequent time step; generating a reward on predicted actions up to the current time step, by comparing the predicted actions against corresponding annotated affective labels.

2. The method of claim 1, wherein one or more ground truth labels are provided only at the end of the sequence of frames of high dimensional data.

3. The method of claim 1, further comprising repeating a), b), and c) for a subsequent frame of the sequence at the subsequent time step, wherein the subsequent frame becomes the current frame and the subsequent time step becomes the current time step.

4. The method of claim 1, wherein the affective label prediction at the current time step represents whether a scene is funny or not funny.

5. The method of claim 1, wherein a value of the reward is based on a majority vote of frame-level affective label prediction results up to the current frame at the current time step.

6. The method of claim 1, wherein a value of the reward is based on the minimum percentage vote of frame-level results.

7. The method of claim 1, wherein a value of the reward is zero until a frame for which annotated affective labels are available.

8. The method of claim 1, wherein the sequence of frames of high dimensional data includes a sequence of faces appearing in a video scene.

9. The method of claim 8, wherein the sequence of faces is a sequence of faces of an individual character in the video scene.

10. The method of claim 8, wherein the sequence of faces is a sequence of faces of an individual character in the video scene and wherein when multiple faces are shown in the video scene the sequence of faces is a sequence of faces of located in the center of the scene.

11. A system for performing sequence level prediction of a sequence of frames of high dimensional data, comprising:
    a processor;
    a memory coupled to the processor; and
    processor-executable instructions embodied in the memory, the instructions being configured to cause the processor to perform the following when executed:
    a) providing one or more affective labels at the end of the sequence of frames of high dimensional data, wherein each label of the one or more affective labels pertains to the entire sequence of frames of high dimensional data;
    b) taking an action with an agent controlled by a machine learning algorithm for a current frame of the sequence at a current time step, wherein an output of the action represents affective label prediction for the frame at the current time step; and
    c) transforming a pool of actions taken up until the current time step including the action taken with the agent into a predicted affective history for a subsequent time step; generating a reward on predicted actions up to the current time step, by comparing the predicted actions against corresponding annotated affective labels.

12. The system of claim 11, wherein the one or more ground truth labels are provided only at the end of the sequence of frames.

13. The system of claim 11, further comprising repeating a), b), and c) for a subsequent frame of the sequence at the subsequent time step, wherein the subsequent frame becomes the current frame and the subsequent time step becomes the current time step.

14. The system of claim 11, wherein the affective label prediction at the current time step represents whether a video scene is funny or not funny.

15. The system of claim 11, wherein a value of the reward is based on a majority vote of frame-level affective label prediction results up to the current frame at the current time step.

16. The system of claim 11, wherein a value of the reward is based on the minimum percentage vote of frame-level results.

17. The system of claim 11, wherein a value of the reward is zero until a frame for which annotated scene affective labels are available.

18. The system of claim 11, wherein the sequence of frames of high dimensional data includes a sequence of faces appearing in a video scene.

19. The system of claim 18, wherein the sequence of faces is a sequence of faces of an individual character in the video scene.

20. The system of claim 18, wherein the sequence of faces is a sequence of faces of an individual character in the video scene and wherein when multiple faces are shown in the video scene the sequence of faces is a sequence of faces of located in the center of the scene.

21. A non-transitory computer-readable medium having executable instructions embodied therein, the instructions being configured cause a computer to perform the following when executed:
   a) providing one or more affective labels at the end of a sequence of frames of high dimensional data, wherein each affective label of the one or more affective labels pertains to the entire sequence of frames of high dimensional data;
   b) taking an action with an agent controlled by a machine learning algorithm for a current frame of the sequence of frames of high dimensional data at a current time step, wherein an output of the action represents affective label prediction for the frame at the current time step; and
   c) transforming a pool of actions taken up until the current time step including the action taken with the agent into a predicted affective history for a subsequent time step; generating a reward on predicted actions up to the current time step, by comparing the predicted actions against corresponding annotated affective labels.

22. The non-transitory computer-readable medium of claim 21, wherein the one or more ground truth labels are provided only at the end of the sequence of frames of high dimensional data.

23. The non-transitory computer-readable medium of claim 21, further comprising repeating a), b), and c) for a subsequent frame of the sequence at the subsequent time step, wherein the subsequent frame becomes the current frame and the subsequent time step becomes the current time step.

24. The non-transitory computer-readable medium of claim 21, wherein the affective label prediction at the current time step represents whether a video scene is funny or not funny.

25. The non-transitory computer-readable medium of claim 21, wherein a value of the reward is based on a majority vote of frame-level affective label prediction results up to the current frame at the current time step.

26. The non-transitory computer-readable medium of claim 21, wherein a value of the reward is based on the minimum percentage vote of frame-level results.

27. The non-transitory computer-readable medium of claim 21, wherein a value of the reward is zero until a frame for which annotated affective labels are available.

28. The non-transitory computer-readable medium of claim 21, wherein the sequence of frames of high dimensional data includes a sequence of faces appearing in a video scene.

29. The non-transitory computer-readable medium of claim 28, wherein the sequence of faces is a sequence of faces of an individual character in the video scene.

30. The non-transitory computer-readable medium of claim 28, wherein the sequence of faces is a sequence of faces of an individual character in the video scene and wherein when multiple faces are shown in the video scene the sequence of faces is a sequence of faces of located in the center of the scene.

* * * * *